United States Patent [19]

Bommarito

[11] Patent Number: 5,581,933
[45] Date of Patent: Dec. 10, 1996

[54] FISHING SCENT DELIVERY APPARATUS

[76] Inventor: Alexander A. Bommarito, 12555 W. Freeland Rd., Freeland, Mich. 48623

[21] Appl. No.: 440,902

[22] Filed: May 15, 1995

[51] Int. Cl.$^6$ ................................................ A01K 85/00
[52] U.S. Cl. ........................ 43/42.06; 43/44.99; 43/41
[58] Field of Search ....................... 43/42.06, 41, 44.99

[56] References Cited

U.S. PATENT DOCUMENTS

| | | | |
|---|---|---|---|
| 2,674,058 | 4/1954 | Lindenberg | 43/42.06 |
| 2,922,246 | 1/1960 | Mileschuk | 43/42.06 |
| 2,994,983 | 8/1961 | Best | 43/41 |
| 3,403,466 | 10/1968 | Young | 43/42.06 |
| 3,688,430 | 9/1972 | Balch | 43/42.06 |
| 4,888,907 | 12/1989 | Gibbs | 43/42.06 |
| 4,924,620 | 5/1990 | Kimberley | 43/44.99 |
| 4,953,319 | 9/1990 | Kasper | 43/42.06 |
| 4,964,235 | 10/1990 | Gruelle | 43/42.06 |
| 5,321,906 | 6/1994 | Bommarito | 43/42.06 |
| 5,471,780 | 12/1995 | Hopson | 43/42.06 |

*Primary Examiner*—Kurt Rowan
*Attorney, Agent, or Firm*—Merlin B. Davey

[57] ABSTRACT

This invention provides a fishing scent delivery apparatus comprising a closed outer vessel having an inflatable wall and an inner chamber disposed therein, the inner chamber comprising a body having an inlet-outlet port passing through the wall of the outer vessel and being sealed thereto, the inner chamber having at least one aperture therein communicating between the inner chamber and the outer vessel.

5 Claims, 1 Drawing Sheet

FISHING SCENT DELIVERY APPARATUS

BACKGROUND OF THE INVENTION

Fishing techniques have developed from the use of live bait to the use of many different types of artificial lures. Recently, a number of scents have been manufactured to address the highly developed sensory system in fish and a number of application techniques have been proposed, including various controlled attractant discharge mechanisms such as described, for example, in U.S. Pat. No. 4,888,907 to Gibbs and U.S. Pat. No. 5,321,906 to Bommarito and the addition of scents to the material used for lines, lures and artificial bait. While useful, such systems are not suitable for using semi-solid, chum-like scenting material as is becoming common in the art.

SUMMARY OF THE INVENTION

The present invention provides an active fishing scent release or delivery apparatus comprising a closed outer vessel having an inner vessel disposed therein, said outer vessel having an inflatable wall, said inner vessel comprising a body having an inlet-outlet port passing through said wall of said outer vessel and being sealed thereto, said body having at least one aperture communicating between said inner and said outer vessel therein.

BRIEF DESCRIPTION OF THE DRAWING

The invention is further illustrated by the accompanying drawing wherein.

DETAILED DESCRIPTION OF THE INVENTION

Figure 1:
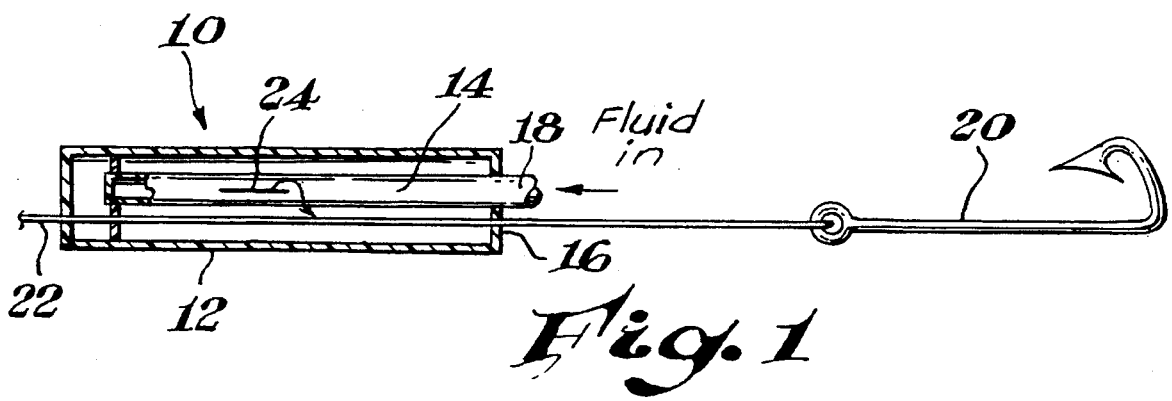
FIG. 1 is a cutaway view of one embodiment of the present invention illustrating the flow direction that occurs when instilling a fish attractant in an apparatus of this invention.

Referring to FIG. 1, a fishing scent delivery system 10 in accordance with one embodiment of this invention is seen to comprise a generally tubular outer vessel 12 and a generally tubular inner vessel or chamber 14. Chamber 14 is disposed within outer vessel 12 and extends through wall portion 16 of outer vessel 12 via inlet-outlet port or neck 18. Port 18 is sealed to wall portion 16 and is adapted to operatively engage means for instilling fish attractant materials from standard syringes and containers available on the market that contain packaged fish attractants such as, for example, Berkeley Strike(TM) products. The attractant material enters and leaves outer vessel 12 via aperture 24 in chamber 14. A fish hook 20 and line 22 may be attached within or on vessel 12 as desired. One means of attaching hooks or fishing lures to the fishing scent delivery system of this invention is illustrated.

Figure 2:
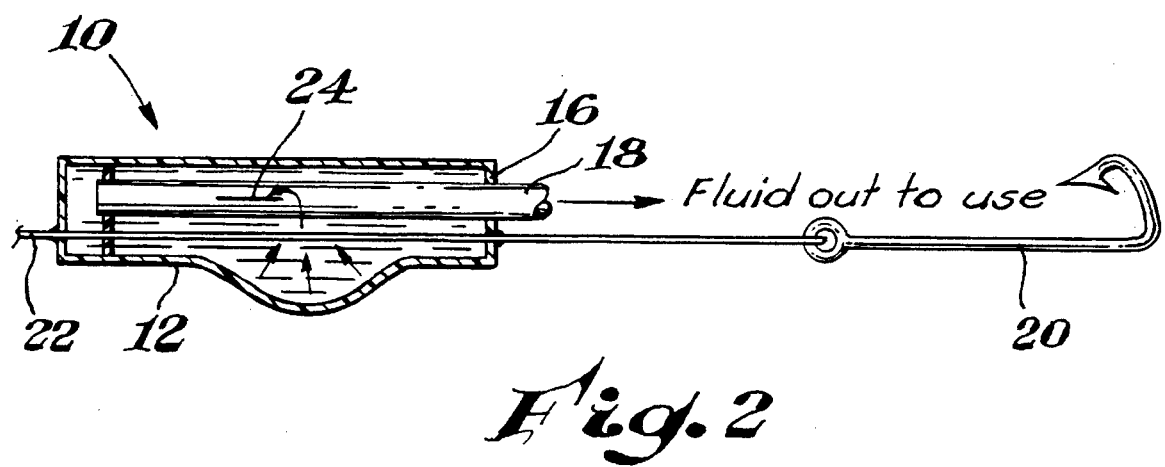
FIG. 2 is a cutaway view illustrating the flow direction that occurs when dispensing a fish attractant.

FIG. 1 illustrates, by means of an arrow, the flow of the fishing scent attractant when instilling the attractant via aperture 24 into outer vessel 12 and FIG. 2 illustrates the flow when the attractant leaves via the same aperture 24, being forced out by the pressure resulting from the inflation of outer vessel 12, the rate of dispensing being dependent upon the consistency of the attractant material and the size and number of the slits or holes comprising the aperture.

The fishing scent delivery apparatus of this invention can be made of any commercially available plastics materials such as described, for example, in U.S. Pat. No. 5,321,906, which is incorporated herein by reference, and include, for example, silicones, natural rubbers, latexes and similar materials.

The apparatus of this invention provides a generally fixed or controlled rate of delivery, the control being obtained by (1) the size of the inner chamber outlet port, (2) the wall thickness and type of expandable material comprising the outer vessel, (3) the thickness or viscosity of the attractant material employed and (4) the size and/or the number of holes or slits comprising the aperture.

The apparatus of this invention differs from all known art in not having a valve type control or rate controlling filter. Thus not only liquid attractants but also semi-solid scenting material including pastes and high particulates, e.g., chum and chum-like attractants can be dispensed by the apparatus of this invention.

Various modifications can be made in the present invention without departing from the spirit or scope thereof as will be apparent to those skilled in the art.

I claim:

1. A fishing scent delivery apparatus comprising a closed outer vessel having an inner vessel disposed therein, said outer vessel being inflatable with a wall portion, said inner vessel comprising a body having an inlet-outlet port passing through said wall portion of said outer vessel and being sealed thereto, said body having at least one aperture therein communicating between said inner and said outer vessel.

2. Apparatus of claim 1 wherein a fishing line is enclosed within and passes through said vessels for baiting and fishing.

3. Apparatus of claim 1 wherein said inner and outer vessels are in a generally tubular form.

4. Apparatus of claim 1 wherein said body of said inner vessel is flexible.

5. Apparatus of claim 1 wherein said inlet-outlet port is adapted to operatively engage the outlet of commercially packaged fish attractants.

\* \* \* \* \*